United States Patent [19]

Antoni

[11] Patent Number: 4,493,041

[45] Date of Patent: Jan. 8, 1985

[54] METHOD AND APPARATUS FOR DETERMINING THE WORKING RANGE OF A DOUBLE-ACTING CLAMPING CYLINDER FOR ACTUATING CHUCKING DEVICES ON MACHINE TOOLS

[75] Inventor: Herbert Antoni, Grevenbroich, Fed. Rep. of Germany

[73] Assignee: Paul Forkardt GmbH & Co, KG, Düsseldorf, Fed. Rep. of Germany

[21] Appl. No.: 347,201

[22] Filed: Feb. 9, 1982

[30] Foreign Application Priority Data

Feb. 18, 1981 [DE]  Fed. Rep. of Germany ....... 3105872

[51] Int. Cl.³ ............................................. G06F 15/46
[52] U.S. Cl. .................. 364/474; 82/28 R; 279/4
[58] Field of Search ............. 82/28 R, 30; 279/4; 364/474, 475

[56] References Cited

U.S. PATENT DOCUMENTS

| | | | |
|---|---|---|---|
| 3,456,955 | 7/1969 | Bruinsma | 279/4 |
| 4,007,943 | 2/1977 | Scharfen et al. | 279/4 |
| 4,080,716 | 3/1978 | vom Dorp | 279/4 |
| 4,254,676 | 3/1981 | Wilson | 82/28 R |

FOREIGN PATENT DOCUMENTS 142854  7/1980  Fed. Rep. of Germany .......... 279/4

*Primary Examiner*—Leonidas Vlachos
*Attorney, Agent, or Firm*—Martin A. Farber

[57] ABSTRACT

The present invention relates to a method and apparatus for determining a working range of a double-acting clamping cylinder for actuation of operating devices, such as supporting, centering or chucking devices, respectively on machine tools, particularly replaceable chucks on lathes, giving consideration to a post-tightening distance and controlling of the drive for effecting of the machining of the workpiece. In order to avoid a replacement of control cams or adjustment of limit switches of the prior art, the total path of the clamping cylinder is monitored by a length-measuring instrument which gives off electric pulses to a control device which determines the total stroke of the corresponding supporting, centering or clamping device and stores in the control device the end positions thereof lying within the total path of the clamping cylinder within and, with due consideration to the post-tightening stroke associated with the corresponding operating device, determines the working range of the clamping cylinder for the respective operating device outside of which working range the drive for effecting the machining of the workpiece is blocked by the control device.

10 Claims, 2 Drawing Figures

METHOD AND APPARATUS FOR DETERMINING THE WORKING RANGE OF A DOUBLE-ACTING CLAMPING CYLINDER FOR ACTUATING CHUCKING DEVICES ON MACHINE TOOLS

The present invention relates to a method of determining the working range of a double-acting clamping cylinder for actuation of an operating device such as a supporting, centering or clamping device on machine tools, particularly replaceable chucks on lathes, with due consideration of a post tightening distance and with control of the drive for the machining of the workpiece, as well as a device for carrying out this method.

Power chucking devices and particularly power-actuated jaw chucks are customarily actuated by a pneumatic or hydraulic cylinder installed on the end of the spindle of the machine tool. Chucking devices and clamping cylinders are rigidly connected to each other by a pull bar or a pull tube. The piston of the clamping cylinder carries out a stroke which is proportional to the movement of the clamping elements during the opening and closing of the chucking device. The end positions of the total stroke of the specific chucking device are pre-established by the maximum range of movement of the chucking device or by the maximum available displacement path of the piston within the clamping cylinder.

In the event that the workpiece is clamped almost at the end of the stroke of the clamping elements there is the danger that the clamping force necessary for the machining of the workpiece will not be fully established because the total path of the chucking device has already been reached or is reached by the clamping elements digging into the workpiece or by the deformation of the workpiece which occurs upon the clamping. In these cases, a hydraulic or pneumatic clamping pressure verification device which is customarily present will indicate the existence of sufficient clamping force without such a sufficient clamping force actually being present.

In order to remedy this lack of reliability it is known to monitor the position of the clamping cylinder piston instead of the position of the clamping elements. For this purpose, in one known embodiment a control rod extends rearwardly from the clamping cylinder, actuating one or more electric limit switches via a control cam. These limit switches are set in such a manner that just before the end positions of the total stroke of the chucking device is reached an electric signal is emitted which indicates an existing insecure clamping condition of the workpiece and is used to stop or block the drive of the machine spindle.

Since the total stroke lengths of the chucking devices to be monitored differ in value depending on the nature of the chucking fixture, replaceable control cams or adjustable limit switches are used in the present state of the art. The known clamping-path monitoring device must, therefore, be carefully set each time whenever a chucking device is attached.

It frequently happens in practice that one chucking device must be replaced by another, for instance a jaw chuck by a draw-in arbor, which has a longer or shorter total stroke than the jaw chuck. In such case the operator, contrary to the specifications, at times fails to change the control cam or to set the limit switches in accordance with the new total stroke of the corresponding clamping device. This is a job which requires care and a certain amount of time, particularly as in the newer machine tools, the clamping cylinder is frequently located beneath a cover and is accessible with difficulty.

The object of the present invention therefore is to create a method for determining the working range of a double-acting clamping cylinder for the actuating of supporting, centering and chucking devices on machine tools as well as a corresponding device for the performance of this method which makes the replacement of control cams or resetting of limit switches superfluous.

This object is achieved in accordance with the present invention by monitoring the total path of the clamping cylinder by means of a length-measuring instrument which sends electric pulses to a control device, determining the total stroke of a respective operating device, namely a supporting, centering or chucking device and storing in the control device the end positions of the operating device, which end positions lie within the total stroke of the clamping cylinder, and by taking into consideration a post-tightening stroke associated with the respective operating device, determining for the respective operating device a clamping cylinder working range, outside of which the drive for machining the workpiece is blocked by the control device.

By this proposal in accordance with the invention the advantage is obtained that the setting up or resetting of the clamping stroke control device for a given supporting, centering and chucking device can be effected from a control panel so that work is no longer required on a clamping cylinder, which is installed predominantly concealed. The control device used can be designed in such a manner that, within the working range of the clamping cylinder which is adapted to the specific operating device, there are defined one or more points at which additional signals for the control or monitoring of the supporting, centering or clamping device are emitted without it being necessary to provide additional switches and control cams on the clamping cylinder for this purpose. The time required for changing the clamping stroke control, for instance after installing a new clamping device having a longer or shorter overall stroke, is considerably less since no work need be carried out on the operating device itself or on the clamping cylinder. Finally, a change over is considerably simpler since, in contradistinction to the devices previously known, it is not necessary to set limit switches at a precise switch point or to replace or readjust control cams, each of which results in a large number of potential errors, producing a serious risk of accident.

In order to carry out the method of the invention entirely automatically, it is possible, in accordance with another feature of the invention, to have the operating device undergo an idle (empty) stroke after the attachment of the supporting, centering or chucking device on the clamping cylinder before the workpiece is clamped in place; in this connection the end positions of the clamping cylinder piston which correspond to the total stroke of the operating device are stored in the control device and the working range of the clamping cylinder is fixed in the control device by input into the control device of the post-tightening stroke necessary for the specific operating device. The post-tightening stroke, adapted to the specific supporting, centering or chucking device, can either be introduced from the outside into the control device or be stored within the control device.

The additional advantages obtained by this completely automatic nature of the method of the invention are that mistakes in the setting or changing of the clamping stroke control are prevented since the total stroke of the device is automatically measured and assured, which must be considered a substantial improvement in operating safety. Furthermore, no time is lost for the setting-up or changing over since only a single actuation of the clamping and release process is necessary for automatically receiving the specific working range of the supporting, centering and chucking device, which actuation will in any event be effected as an operating check on the specific operating device at the start of each job.

Each time that the control device is shut off, the values which were previously stored in the control device for determining the working range are erased. Each time that the control device is turned on, without any workpiece an idle stroke of the supporting, centering and chucking device is to be performed for the determination of the working range of the clamping cylinder by loading into the memories in the control device before the drives are started by the control device in order to effect the machining of the workpiece.

The automatic determination of the specific working range takes place only when the memories of the control device are not filled. The erasing of the memory takes place only upon the disconnection of the control device, so that no unnecessary redetermination of the working range which previously was set can take place during an entire working period.

If the establishment of the working range for the specific supporting, centering and chucking device after the connection of the control device should be forgotten by not performing any idle stroke of the apparatus, nevertheless no impermissible or dangerous condition of operation can arise. In this case, the open position and the subsequently clamped position after the clamping of the first workpiece would be evaluated by the control device as a determination of the working range, even though this was actually not intended. After subtraction of the post-tightening strokes N, the device would in all cases be within a range which, to be sure, only appears to be impermissible and the rotary drive for the machining of the workpiece would not be actuated. Correction of this condition is then readily possible by disconnecting the control device and then turning it on again and carrying out an idle stroke. In this way erroneous operation resulting in a dangerous operating condition is impossible.

The device for the performance of the method of the invention comprises, corresponding to the known state of the art, a clamping cylinder which is operatively connected by an actuating rod to the supporting, centering and clamping device and the instantaneous position of the piston of the clamping cylinder can be determined by a monitoring device which sends electric signals for the control of drives for the machining of the workpiece.

A further development of this device in accordance with the invention resides in the monitoring device being developed as an electrical length-measuring device mechanically connected with the piston of the clamping cylinder, the measuring device being connected, for the processing of its electric signals which are sent continuously as a function of the instantaneous position of the piston, to a control device which is provided with memories to store the signal values of the length-measuring instrument which correspond to the end positions of the total stroke of the supporting, centering and chucking device and of the working stroke of the clamping cylinder. The length-measuring instrument can be developed, for instance, as a linear potentiometer producing analog signals or as an incremental measuring instrument producing digital signals.

With the above and other objects and advantages in view, the present invention will become more clearly understood in connection with the detailed description of a preferred embodiment, when considered with the accompanying drawings, of which:

Figure 1:
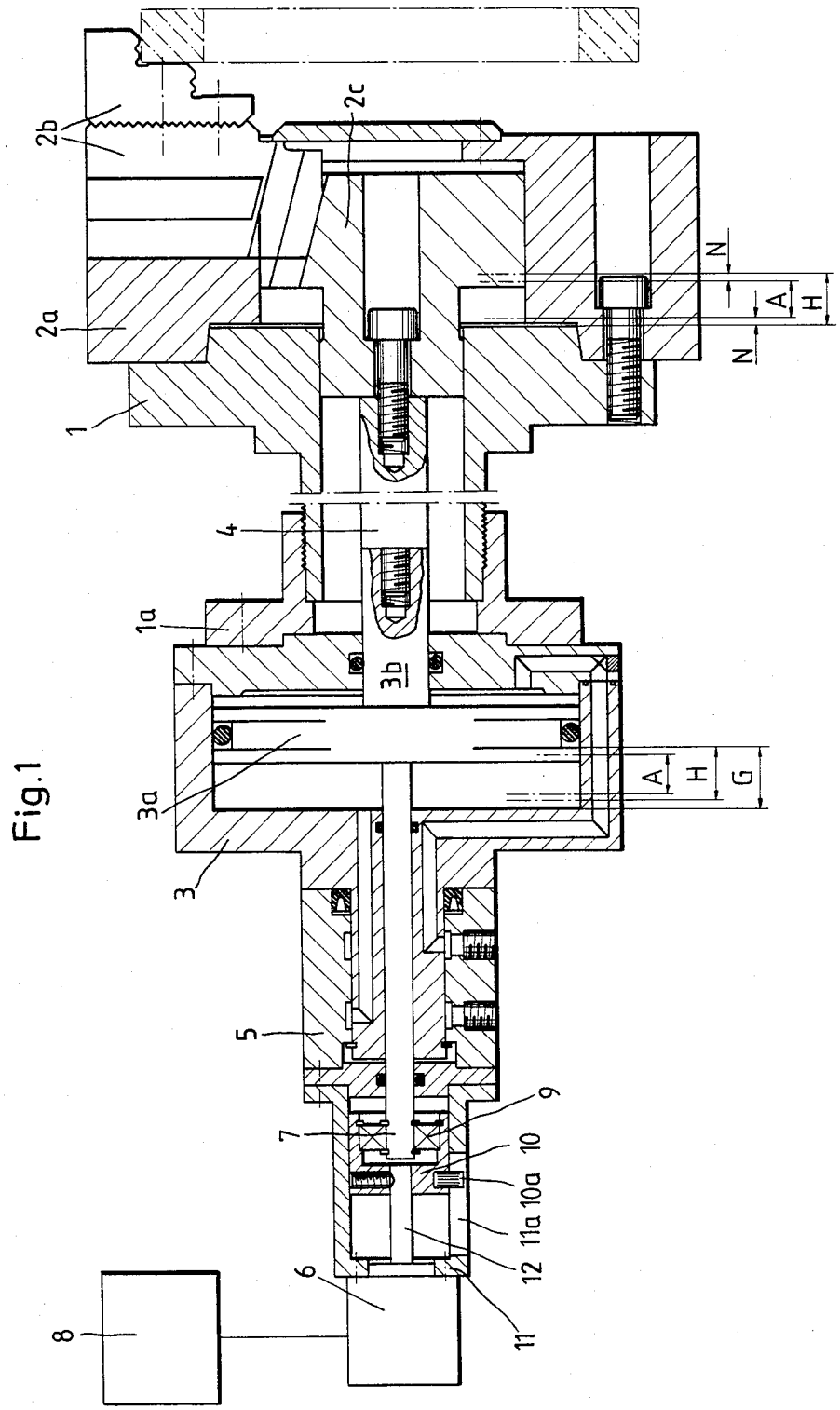
FIG. 1 is a longitudinal section through the device, based on a jaw chuck.

The drawing shows a spindle 1 of a lathe (otherwise not shown) to the front flange of which a clamping device 2 is fastened. This clamping (chucking) device 2a, 2b, 2c is a jaw chuck in the embodiment shown. The chuck body 2a and a clamping jaw 2b consisting of base and top jaws are shown in the drawing. The drive of the clamping jaws 2b is effected by a chuck piston 2c which is guided in axially displaceable manner within the chuck body 2a and is in engagement with the base jaws of the chucking jaws 2b via a wedge transmission.

On basis of the construction of the chucking device there exists a total stroke H of the chucking device which is indicated in the drawing below the chucking device.

In order to guarantee the build-up of the holding force necessary for the specific machining job upon the clamping of a workpiece between the clamping jaws 2b both from the outside and from the inside, the chuck piston 2c must be prevented from being at the front or rear end of its total stroke H before the necessary clamping force has built up. Because of possible deformation of the workpiece or the digging of the teeth of the jaws into the workpiece it must be insured in all cases that an additional path of the clamping jaws 2b is still possible when the jaws rest against the workpiece. For this reason the working stroke A is obtained by reducing both sides of the total stroke H by a so-called tightening stroke N.

For actuating the chucking device a clamping cylinder 3 which rotates with the spindle 1 is fastened to a rear flange 1a of the spindle 1, the piston 3a of said cylinder being connected via its piston rod 3b and an actuating rod 4 to the chuck piston 2c. The clamping cylinder 3 is a double-acting cylinder, for instance a hydraulic cylinder, to which the pressure fluid is fed via a pressure fluid transfer housing 5. This pressure fluid transfer housing 5 has a shaft which rotates with the spindle 1 and the clamping cylinder 3 and in which the corresponding holes for the clamping cylinder 3 are formed, and a stationary housing 5 mounted on the rotating shaft and bearing the pressure-fluid connections for a source of pressure fluid not shown in the drawing.

The instantaneous position of the piston 3a within the clamping cylinder 3 can be detected by a monitoring device which is developed as an electric or electronic length-measuring instrument 6. In the embodiment shown this length-measuring instrument 6 comprises a potentiometer, the moving part of which is connected via a pull rod 7 with the piston 3a of the clamping cylinder 3. The signals produced by this length-measuring instrument 6, which may be analog or digital signals, are fed to a control device 8 which cooperates with the control of the machine tool and prevents, for instance, the rotary drive for the spindle 1 from being turned on when the chuck piston 2c of the chucking device 2 is in a position outside of the working stroke A.

So that the rotation of the control rod 7 is not transmitted to the movable part of the length-measuring instrument 6, the end of the control rod 7 bears a ball bearing 9 the outer race of which is fixed in a slide bushing 10. The slide bushing 10 is prevented from turning by a pin 10a which engages into a longitudinal slot 11a in a housing 11. The slide bushing 10 furthermore has a rod 12 which extends into the length-measuring instrument 6 and transmits the movement and position of the piston 3a to the length-measuring instrument 6.

After attachment of the clamping device, shown in the form of a jaw chuck, to the spindle 1, the total stroke H of the clamping device is transmitted to the clamping cylinder 3 by a complete opening and closing of the clamping jaws 2b. The possible total path G of the piston 3a itself of the clamping cylinder 3 is shown below this clamping cylinder 3 in FIG. 1. The total stroke H of the attached clamping device lies inside this total path G.

The two end positions of the total stroke H are stored in the control device 8 via the length-measuring instrument 6. Furthermore, a post-tightening stroke N which is fixed in value or established as a function of the nature of the clamping device subtracted by the control device 8 from both sides of the total stroke H so that the working stroke A of the specific clamping device which is attached is stored in the control device 8. After this storage, movement of the piston 3a of the clamping cylinder 3 is possible only within the range of the working stroke A. If the piston 3a is outside the stored working stroke A then the spindle 1 is prevented from starting by the control device 8.

Figure 2:
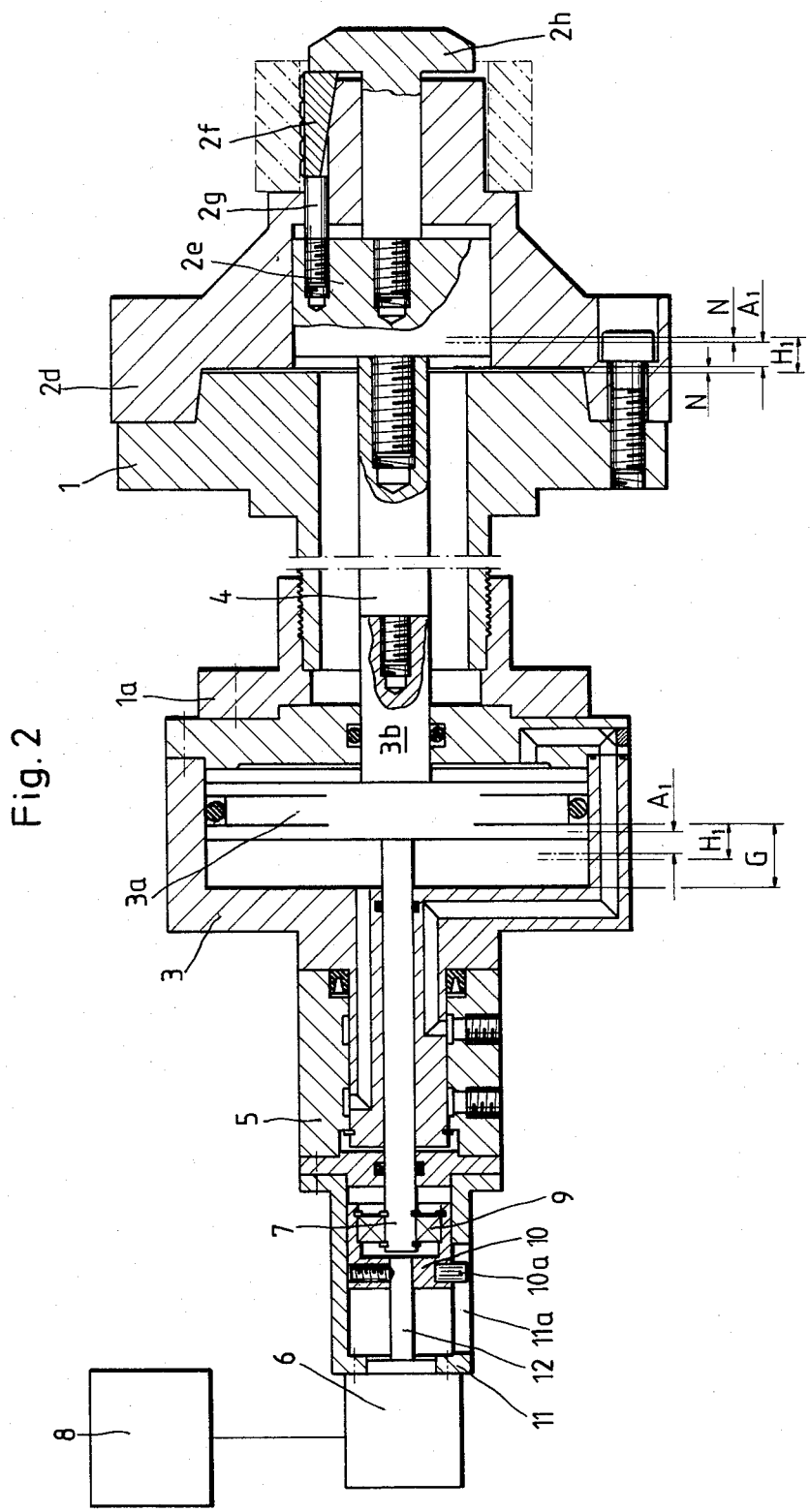
FIG. 2 is a corresponding section to FIG. 1 with a draw-in arbor attached, rather than the jaw chuck.

When the machining processes to be carried out with the jaw chuck of FIG. 1 have been completed, and the jaw chuck is replaced, for instance, by a draw-in arbor, as shown in FIG. 2. This draw-in arbor has a clamping piston 2e which is axially displaceable within a housing 2d. Axial movement of this clamping piston 2e produces, via oblique surfaces which can be noted in FIG. 2, a clamping or loosening movement of clamping pieces 2f which are clamped between pressure pins 2g and a pull bolt 2h.

In FIG. 2 the total stroke $H_1$ and the permissible working stroke $A_1$ are also indicated below the clamping device 2d, 2e, 2f, 2g, 2h which is developed as a draw-in arbor, the working stroke $A_1$ again differing from the total stroke $H_1$ by two post-tightening strokes N. By a complete operating cycle for the opening and closing of the draw-in arbor, the total stroke $H_1$ corresponding to the draw-in arbor is again transmitted via the clamping cylinder 3 to the length-measuring instrument 6. The inclusion of this total stroke $H_1$ in the total path G of the clamping cylinder 3 in FIG. 2 shows that the total stroke $H_1$ of the draw-in arbor is not only less than the total stroke H of the previously clamped jaw chuck but also lies in a different region of the total path G of the piston 3a. By consideration of the post-tightening strokes N, not only are the end positions of the total stroke $H_1$ possible for the draw-in arbor stored but also the corresponding working stroke $A_1$ is stored in the control device 8. In this way, assurance is had that the clamping cylinder 3, after storage of the values of the attached draw-in arbor, can lie only within the working stroke $A_1$ which is now permissible, if the machine tool is operated. In particular, rotation of the spindle 1 is permitted by the control device 8 only when the piston 3a is within the working stroke $A_1$ established for the draw-in arbor.

The method, which has been described on the basis of clamping devices and the corresponding apparatus, can be applied also to supporting and centering devices such as, for instance, power-operated steady rests which are arranged in fixed position. The rotation of the clamping device with the spindle of a machine tool is thus not a prerequisite, particularly since stationary clamping devices or centering devices can also be actuated and monitored with respect to their working range. Herein the term "clamping cylinder" in its operative sense is intended to include the operative piston 3a.

I claim:

1. A method for determining and monitoring the working range of a double-acting clamping cylinder for actuation of an operating device, the latter comprising a supporting device, a centering device or a clamping device, respectively, on machine tools, and with control of a drive for effecting machining of a workpiece held by the operating device, comprising the steps of providing a detecting means, actuating the latter and detecting a total stroke, including end positions thereof, of the operating device when actuating the clamping cylinder, said end positions being inside a total path of displacement of the clamping cylinder without the operating device, providing a control device and storing in said control device said end positions of said total stroke, and determining a working range of the clamping cylinder for the operating device by providing subtraction means and subtracting a post-tightening stroke associated with said operating device from the total stroke, said post-tightening stroke associated with the operating device being a predetermined distance so as to guarantee that a sufficient holding of the workpiece by the operating device has built-up, and providing a length-measuring instrument and electrical means and continuously monitoring the total path of the clamping cylinder by continuously sending electrical signals corresponding to all respective positions of the clamping cylinder from said length-measuring instrument to said control device and providing means for and comparing the respective positions with said working range when operatively connecting the operating device and the workpiece, and providing a blocking means and blocking the drive effecting the machining of the workpiece by the control device when the clamping cylinder is outside of said working range.

2. The method according to claim 1, including the steps of said detecting step comprises performing an idle stroke of the operating device after operatively attaching the operating device to the clamping cylinder but before clamping the workpiece, said storing step comprises storing in the control device end positions of a piston of the clamping cylinder corresponding to the total stroke of the operating device, and said step of determining the working range of the clamping cylinder for said operating device is established in the control device by introducing into the control device said post-tightening stroke required for the operating device.

3. The method according to claim 1 or 2, wherein fixed values for the post-tightening stroke are stored in the control device.

4. The method according to claim 1, further comprising the steps of
   upon each disconnecting of the control device, erasing values for the determination of the working range which have been stored in the control device, and
   after each connection of the control device performing an idle stroke of the operating device, constituting said detecting step, and establishing the working range of the clamping cylinder by loading values associated with said storing and determining steps into a memory in the control device before the control device releases the drive for the machining of the workpiece.

5. In an apparatus for determining and monitoring the working range of a double-acting clamping cylinder having a displaceable clamping cylinder piston for actuation of a respective operating device from time to time, the operating device comprising a supporting device, a centering device or a clamping device, respectively, on a machine tool, the apparatus having an actuating rod releasably connecting the clamping cylinder piston with the operating device, a monitoring means for detecting positions of said clamping cylinder piston of said clamping cylinder, said monitoring means operatively being connected with the clamping cylinder piston, the monitoring means sending electrical signals to a control means, the latter being connected with the monitoring means and for controlling drives for effecting the machining of workpieces adapted to be used with the operating device, the monitoring means establishing a working range of the clamping cylinder piston for the operating device, the working range defining an operating range of the clamping cylinder piston in connection with the operating device within a larger total path of stroke of the clamping cylinder piston, the control means blocking the drives for effecting the machining of the workpieces when the clamping cylinder piston is outside of the operating range, the improvement wherein
   said monitoring means comprises a length-measuring means for monitoring the total path of the clamping cylinder piston continuously sending electrical signals to the control means as a function of the respective position of the clamping cylinder piston, and
   said control means includes memory means for storing end positions of a total stroke, the latter being a first respective idle stroke of the clamping cylinder piston when operatively connected with the respective operating device without the workpieces, said end positions being respectively within the total path of the clamping cylinder piston and being detected by said length-measuring means and sent via the latter via respective of said electrical signals to said control means, and
   said control means includes means for subtracting respective post-tightening strokes associated with the respective operating device from said end positions respectively so as to determine and for storing the respective working range with the respective operating device of the clamping cylinder piston, said post-tightening strokes associated with the respective operating device being predetermined distances so as to guarantee that a sufficient holding of the workpieces by the respective operating device has built-up, and
   said control means includes means for comparing said electrical signals representative of the respective position at each time of said clamping cylinder piston with said respective working range when operatively connected with the respective operating device with the workpieces and means for blocking the drives for effecting the machining of the workpieces when the clamping cylinder piston is outside of the respective working range.

6. The apparatus according to claim 5, wherein said length-measuring means comprises a linear potentiometer means for producing analog signals.

7. The apparatus according to claim 5, wherein said length-measuring means comprises an incremental measuring instrument means for producing digital signals.

8. The device according to claim 5, wherein said memory means of said control means includes fixed-value memories for the post-tightening strokes.

9. The device according to claim 5, further comprising
   means for erasing said memory means of said control means upon disconnecting of the control means, and
   said control means includes means, via said length-measuring means, after turning on of the control means, before the release of said drives, for causing the memory means to be stored with said idle stroke of the clamping cylinder piston in connection with the respective operating device for determining the respective working range for the clamping cylinder piston.

10. The device according to claim 5, wherein said length-measuring means is an electronic measuring means.

* * * * *